R. H. BERKLEY.
MACHINE FOR MAKING LINK MESH.
APPLICATION FILED APR. 20, 1918.

1,317,679.

Patented Oct. 7, 1919.
3 SHEETS—SHEET 1.

Inventor
Richard H. Berkley
By his Attorneys

R. H. BERKLEY.
MACHINE FOR MAKING LINK MESH.
APPLICATION FILED APR. 20, 1918.

1,317,679.

Patented Oct. 7, 1919.
3 SHEETS—SHEET 2.

Inventor
Richard H. Berkley
By his Attorneys

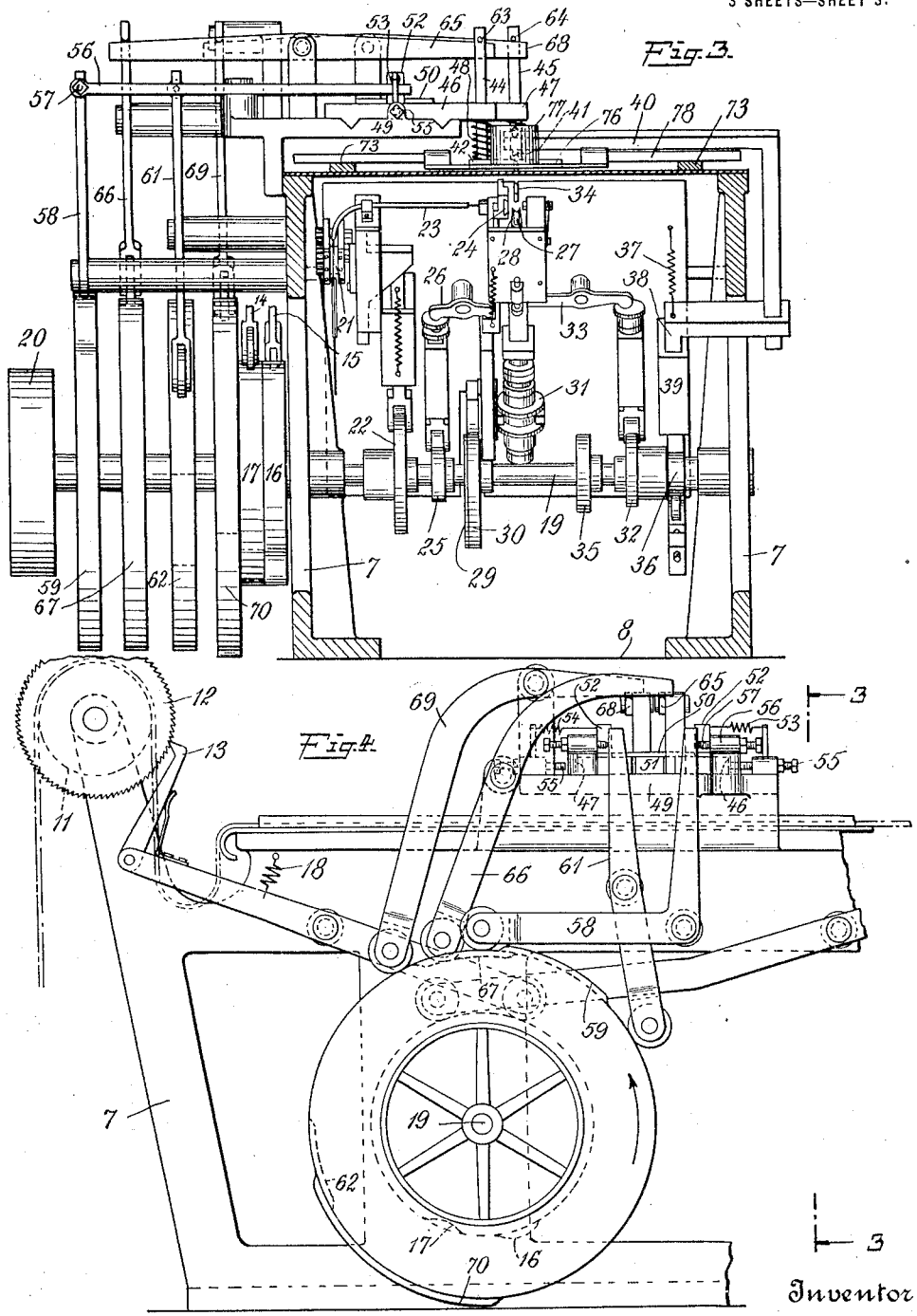

UNITED STATES PATENT OFFICE.

RICHARD HATLEY BERKLEY, OF PLAINVILLE, MASSACHUSETTS, ASSIGNOR TO WHITING & DAVIS COMPANY, A CORPORATION OF NEW YORK.

MACHINE FOR MAKING LINK-MESH.

1,317,679.  Specification of Letters Patent.  Patented Oct. 7, 1919.

Application filed April 20, 1918. Serial No. 229,755.

*To all whom it may concern:*

Be it known that I, RICHARD H. BERKLEY, a citizen of the United States, residing at Plainville, in the county of Norfolk, State of Massachusetts, have invented certain new and useful Improvements in Machines for Making Link-Mesh; and I do hereby declare the following to be a full, clear, and exact description of the invention, such as will enable others skilled in the art to which it appertains to make and use the same.

This invention relates to an apparatus for use in the manufacture of link mesh of the type now largely used in the manufacture of hand-bags.

In the construction of a machine for use in the manufacture of link mesh of the type adapted for the jewelry trade, one of the greatest difficulties encountered is in the construction of the means for supporting the piece of mesh to which the links made by the machine are added. This piece of mesh must be moved step by step so as to present new points on the mesh for the reception of links, and during the pause after each step movement the mesh must be positioned with great accuracy so that the newly formed links may be made to co-act with the mesh properly. The practice which has now become usual is to employ link-forming tools which first bend a piece of wire to the form of a staple, then move the staple forward to project its legs through links of the mesh and then form the staple into a link. It is essential that the piece of mesh moved step by step relatively to the tools be positioned accurately at the end of each step movement so that the legs of the newly-formed staple will pass through the links.

One of the features of the present invention involves the provision of a novel construction for the devices which support the mesh in its relation to the link-forming tools and move it step by step, positioning it accurately with relation to the link-forming tools at the end of each step of its intermittent movement. The mesh is supported in a flat condition upon a plane surface which is preferably disposed horizontally or substantially so, and a feeder is provided which is moved into co-action with the mesh on the support, then moved along to carry the mesh with it over the surface of the support then moved away from the mesh out of engagement therewith, and then retracted to its initial position. This feeder is in the form of a block having a surface of substantial area adapted to contact with the mesh lying flat upon the support. The face of the feeder which contacts with the mesh is provided with grooves and ridges spaced and shaped in accordance with the grooves and ridges which appear upon the surface of a piece of finished mesh so that when this feeder is moved downwardly upon the mesh, its ridges will take into the depressions in the mesh and give the feeder a sufficient hold upon the mesh to enable it to carry the mesh along with it as it is moved in the feeding direction.

In combination with such a feeding mechanism, it is highly desirable that supply and take-up reels be provided for the mesh, which reels are operated automatically in correspondence with the intermittent movement of the feeder. Adjacent to these reels and at opposite ends of the plane surface over which the mesh moves in a flat condition, provision may be made for a certain amount of slack in the mesh. In this way, the amount of the mesh which must be fed along solely by the feeder may be kept within such relatively small limits that no difficulty is experienced in effecting the step by step movement of the mesh by the feeder with such great accuracy as will insure proper co-action of the link-forming tools with the mesh.

The form of intermittent feeding mechanism above referred to is of special utility in a machine for uniting two pieces of link mesh by forming new links meshing with the links at the adacent edges of the two pieces. The manufacture of hand-bags from machine-made mesh usually produces long strips of mesh which are of insufficient width to permit of their use. Thus the machine-made mesh may be of a given width and it may be desirable to make a large number of bags of such a size as to require pieces of mesh of a width less than that of the strip. The cutting of the pieces for the bags from the machine-made strip would leave a narrow strip of great length. Heretofore, great quantities of mesh in the form of such narrow strips have been re-melted, and in some instances the strips have been built up to a greater width by adding links by hand. In both instances, the loss sustained is considerable. In accordance with the present invention, means are provided whereby two such narrow strips, each of them of insufficient width to permit of its use, may be united from end to end forming a new strip which is of sufficient width to permit of its use. For this purpose, the two strips of mesh are fed along together step by step past the link-forming tools, but the movement is not a simple step by step movement. It will be noted that in a finished piece of ring mesh, each ring of the mesh is linked with four other rings; but in the ordinary process of manufacturing link mesh, each ring as it is made is linked with only two other rings. On the other hand, when uniting two pieces of mesh by forming rings and linking them with the rings of the two pieces, it is necessary that each ring as it is formed be meshed with four other rings, that is, two rings of each of the two strips. In order to accomplish this, the feeding movement of the pieces of mesh is made to close up the mesh at the point of reception of new rings, so that two rings of each of the two pieces overlap each other and are therefore in such a position that each leg of the staple for the new link may be projected through two rings. To accomplish this, two feeding devices are employed, each co-acting with both of the strips to be united and one lying in the rear of the point of co-action of the forming tools with the mesh and the other in front of that point. When the rear feeding member is moved forward in co-action with the mesh, the forward feeding member is held stationary in contact with the mesh so that the mesh between these two feeding members is closed up the required amount. While in this condition, the link-forming tools are operated to form a staple, project each leg of the staple through two overlying rings of one of the pieces of mesh and then form the staple into a ring. Thereafter, the forward feeding member is moved forward in co-action with the mesh to move the portion of the mesh which is ahead of the forming tools a distance sufficient to restore the mesh to its original extended condition; then the forward feeding member is moved out of contact with the mesh, back, and then into co-action with the mesh again so that it is in condition to hold the forward portion of the mesh while the rear feeder is again operated to feed the rear portion forward.

With a machine constructed and operated in the manner above outlined, it is possible to unite two long strips of mesh which are too narrow to be used without first increasing their width; and to do this work by mechanism which is automatic throughout, so that it requires no attention of an operator other than such general supervision as is ordinarily given automatic machinery.

These and other features of the invention will be better understood by reference to the following description taken in connection with the accompanying drawings which illustrate the preferred embodiment of the invention.

In these drawings:

Fig. 3 is a transverse section on line 3—3 of Figs. 1 and 4;

Fig. 4 is an elevation of a portion of the machine;

Fig. 5 is a sectional detail view through the two feeders; and

Fig. 6 is a view of a piece of ring mesh to which reference will be made in the description of the operation of the machine.

Figure 1:
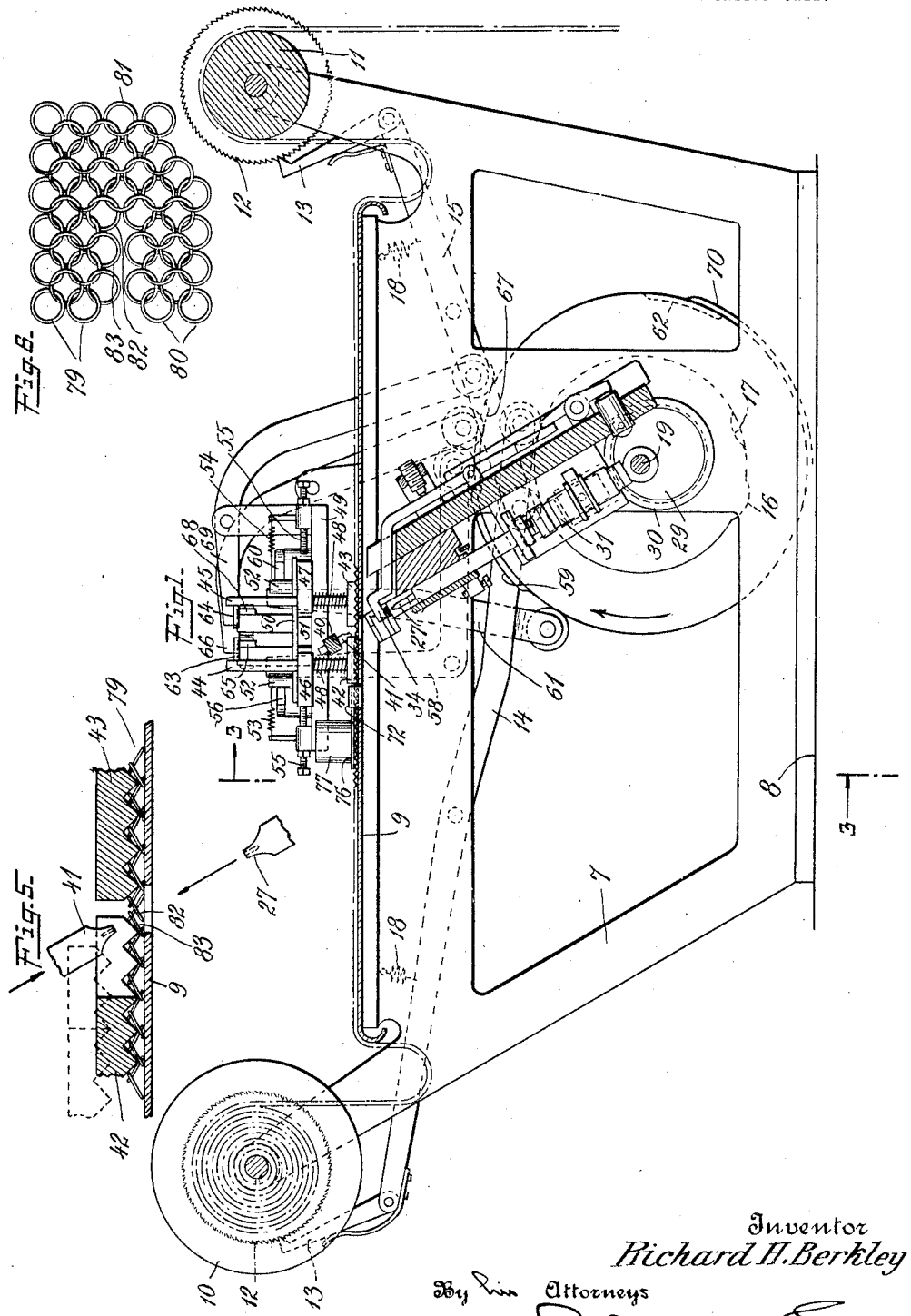
Figure 1 is a longitudinal section of the machine.

Referring to these drawings, the frame of the machine consists of two side-frames 7 mounted in upright positions upon a base 8. The upper edges of these side-frames support a plate 9, of sheet metal having a smooth polished surface upon which the mesh is laid in a flat, extended condition and over which the mesh is fed step by step. At their ends the side-frames are extended upward to support a supply reel 10 and a take-up reel 11, these reels being mounted for rotation on shafts carried by the side-frames, as is usual. The two reels are offset from the ends of the plate 9 to provide for loops in the mesh between the reels and the adjacent ends of plate 9, as is indicated by the dotted lines in Fig. 1. The presence of such loops compensates for any difference in the speed of the supply and take-up of the mesh, relatively to the feed of the mesh over the support 9. Each reel is provided with a ratchet 12 with which a spring-pressed pawl 13 co-acts. These pawls are pivotally mounted upon levers 14 and 15 which are pivoted upon one of the side-frames of the machine. At their adjacent ends, the levers 14 and 15 carry rollers which ride upon the periphery of cams 16 and 17. The rollers on the levers 14 and 15 are held in engagement with the cams by springs 18 (Fig. 1), the cams 16 and 17 are secured upon an operating shaft 19 to which rotational movement may be imparted in any suitable manner, as by means of a belt running on a pulley 20. The cams 16 and 17 are provided, one with a projection and one with a depression, as indicated in Fig. 4, these being positioned so that the two levers are rocked on their pivots substantially simultaneously in order to actuate the supply and take-up reels.

The forming tools for forming the links and meshing them with the links of the fabric may be of the usual or any suitable construction; such, for instance, as that indicated in Patents No. 948,615 and 1,144,724. In the drawings, I have shown link-forming tools of the type illustrated and described in an application for United States patent filed by A. C. Pratt on April 16, 1918, and serially numbered 228,923. These tools are mounted below the plate 9 and at an incline to the vertical, as shown in Fig. 1 so that the axis of the link-forming members is substantially transverse to the plane of the rings with which the rings made by the tools are meshed. The only respect in which the link-forming devices illustrated in the drawings differs from those ordinarily employed is that the die which lies above the mesh is carried by a supporting structure which extends out to the side of the machine to allow ample space for the two strips of fabric to be fed over the surface of the support 9.

The link-forming devices illustrated in the drawings may be briefly described as follows:

A pair of geared feed rollers 21, actuated by a pawl and ratchet mechanism from a cam 22 on the power shaft 19, feeds wire forward through a curved tube 23, to the cutter 24 and dies. The cutter 24 is actuated by a cam 25 on the shaft 19 through a rocking lever 26. The die-rod 27 with the die formed on its end and the resilient prongs 28 carried by a plunger encircling the die-rod are actuated by an eccentric 29 on the power-shaft 19, whose eccentric strap 30 is connected to the housing 31, to which the die-rod is connected. The prongs are started on their retractile movement with the die-rod by a cam 32 upon the power-shaft actuating pivoted lever 33. The anvil 34 (Fig. 1), by which the length of wire is bent to the form of a staple, is actuated by a cam 35 on the operating shaft through the mechanism shown in Fig. 1. Near the end of the shaft 19 is a cam 36 which, with a spring 37, reciprocates a rod 38, moving in the housing 39 secured to one of the side-frames. This rod is extended laterally through an opening in the side-frame, then up to a point above the supporting plate 9 and then laterally as shown at 40 in Fig. 3 a substantial distance and at its end it carries the upper die 41 in line with the die 27.

The two feeders 42 and 43 are shown on an enlarged scale in Fig. 5. Each of them is a block of substantial length and width and on the bottom face of each of these blocks are a plurality of parallel grooves as indicated in Fig. 5. The spacing of these grooves and their depth and shape conform closely to the spacing, depth, and shape of the grooves in the surface of a piece of mesh. The ridges on the face of the feeder may thus enter the depressions in the surface of the piece of mesh in the manner indicated in Fig. 5; so that the feeder takes such a hold upon the piece of mesh as to enable it to move the mesh over the smooth polished surface of the supporting plate 9. Each of the feeders is mounted rigidly upon the lower end of a post 44 and 45 respectively. These posts 44 and 45 extend upwardly through openings in slides 46 and 47, respectively. On each post is a coiled spring 48 between the feeder and the slide and tending constantly to force the feeder downwardly into contact with the mesh. Each slide 46 and 47 is adapted to be moved in the direction of the length of the machine upon a bed-plate 49, and for this purpose, the bed-plate is provided with V-shaped grooves as indicated in Fig. 3; and each slide 46 and 47 is provided with ridges or keys adapted to enter these grooves. In order to guard against displacement of the slides 46 and 47, a plate 50 is provided which extends over the upper surfaces of the slides. This plate is secured to a block 51 mounted upon the bed-plate 49 between the two slides. The overlying plate 50 has slots therein extending lengthwise of the machine, through which extend posts 52, projecting upwardly from the slides 46 and 47. A spring 53 is connected to the post 52 of the slide 46 and to a pin projecting upwardly from the bed-plate 49 so that this spring tends always to move the slide 46 rearwardly. A similar spring 54 is connected in a similar manner to the post 52 of the slide 47 and tends always to move that slide forwardly. The rearward movement of the slide 46 and the forward movement of the slide 47, under the actuation of these springs, carries the posts 52 of these slides into engagement with adjustable stop screws 55 mounted upon the bed-plate 49.

The slide 46 is moved forwardly against the tension of spring 53 by a rocking lever 56 pivotally mounted upon an extension of the bed-plate 49. One end of this lever 56 engages the rear side of the post 52 of the slide 46. The other end of lever 56 carries an adjustment screw 57, which is engaged by one end of a bell-crank lever 58 (Fig. 4), pivoted upon one of the side-frames of the machine and carrying at its opposite end a roller which travels upon the periphery of a cam 59 secured upon the shaft 19. The slide 47 is similarly moved against the tension of its spring 54 by a pivoted lever 60 whose end carries an adjustment screw adapted to be engaged by one end of a pivoted lever 61, whose roller travels upon the periphery of a cam 62 upon the power-shaft 19. The posts 44 and 45 rising from the feeders 42 and 43 have horizontal pins 63 and 64 at their upper ends. One end of a lever 65 pivoted on the bed-plate 49 extends under the pin 63 of the feeder 42. The other end of this lever 65 extends under one end of a pivoted lever 66, whose opposite end carries a roller running on the periphery of a cam 67 on the power-shaft 19. One end of a pivoted lever 68 extends under the pin 64 of the feeder 43 and its opposite end extends under a pivoted lever 69, whose roller travels on the periphery of a cam 70 on the power-shaft. It will be noted that the rocking of the lever 65 on its pivot raises and lowers the rear feeder 42, the lowering of the feeder being effected by its spring 48. Also, the rocking of the lever 56 on its pivot results in lateral movement, or movement in the horizontal direction, of the slide 46 and the feeder 42 carried thereby; the movement in one direction being effected by the spring 53. Similarly, the feeder 43 may be moved up and down by the rocking movement of the lever 68, and may be moved lengthwise of the machine horizontally by the rocking of the lever 60. The cams 59, 62, 67, and 70 are accurately formed and positioned upon the power-shaft so as to make these movements of the two feeders occur in a definite time relation. Each of the two feeders is moved downward while in its rear position to carry it into contact with the mesh, and is moved forward in contact with the mesh so as to carry the mesh along with it over the surface of the plate 9; it is moved upward while in its forward position to carry it out of contact with the mesh, and is then moved rearward to its initial position. The rear feeder 42 is moved forward while in the downward position in contact with the mesh at a time when the forward feeder 43 is held stationary in its downward position in contact with the mesh. This causes the mesh lying between the two feeders to be closed up slightly so that each leg of a staple formed by the link-forming tools may be passed through two rings which overlie each other substantially.

Figure 2:
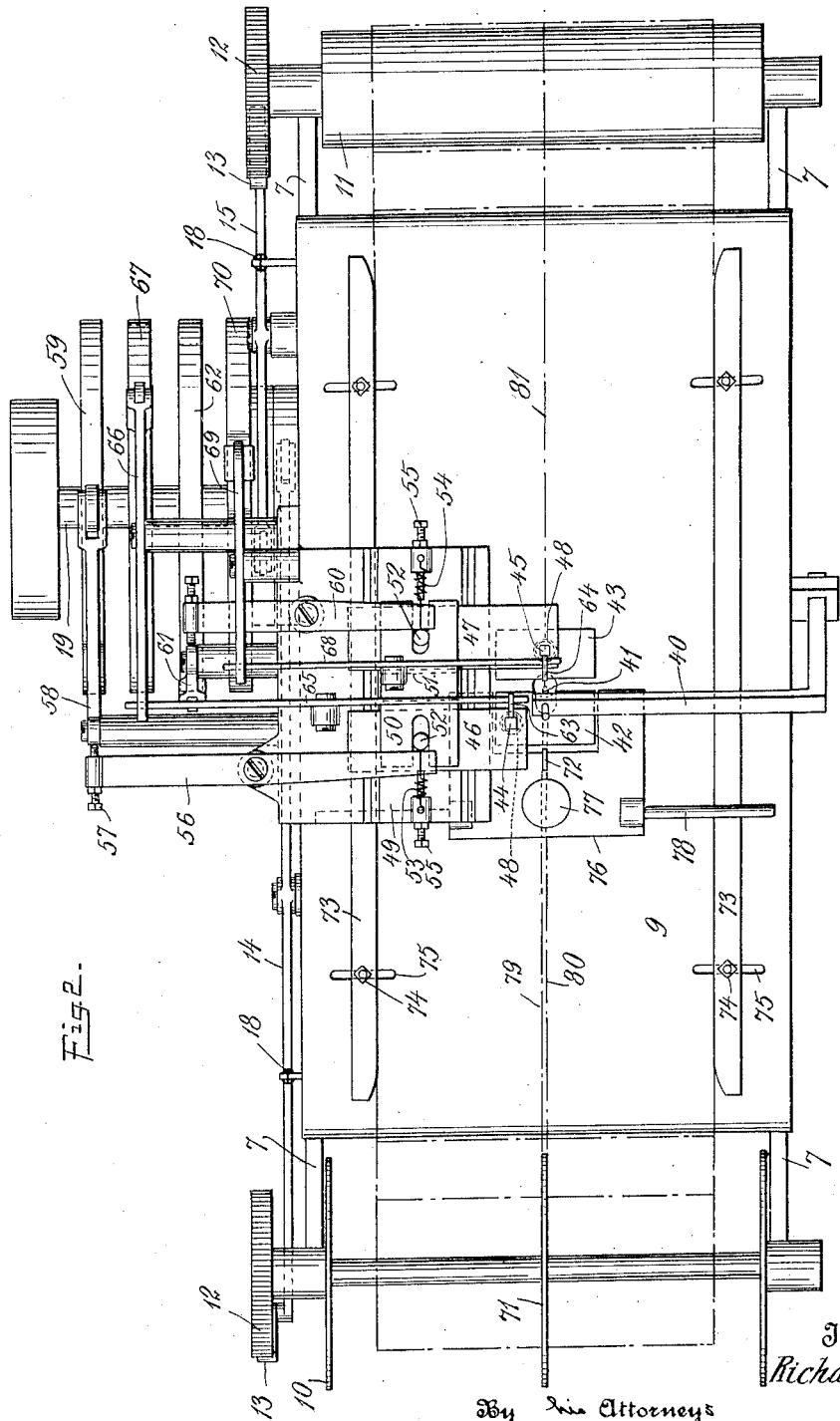
Fig. 2 is a plan view.

When the machine is used for uniting two long strips of mesh of insufficient width to make them useful, the supply reel 10 is preferably provided with an intermediate flange 71 (Fig. 2), and the two strips to be united are wound on this reel on opposite sides of the flange. Also, a projection is provided upon the support 9, close to the point at which the links are made and added to the mesh, as shown at 72 in Fig. 2. This projection is of such width that when the adjacent edges of the two strips of mesh move along they contact with opposite sides of the projection; thus, the edges of the two strips will be at the distance apart required for proper co-action of the link-forming mechanism with the links at the edges of the two strips. A pair of side-guides are provided to prevent the two strips from moving away from each other. These side-guides are shown at 73. They are fastened in position by securing devices 74, which pass through slots 75 in the plate 9, thus permitting of arranging the guides 73 in any position over an adequate range of adjustment.

In order to insure that the mesh will be held in a flat and extended position upon the surface of the plate 9, a smoothing and extending device is preferably employed, consisting of a sheet metal plate 76 having a weight 77 thereon. Rods 78 project laterally from this plate 76 and bear upon the side-guides 73. The plate 76 preferably lies immediately in rear of the feeder 42; it may be shaped to partially inclose the feeder 42 and be provided with a slot in which the projection 72 is received.

Referring to Fig. 4, the relation of the cams and the sequence of the steps of the operation of the feeders will be indicated:

Cam 59 co-acts with the roller on the lever 58 for moving the rear feeder 42 forward and back. The cam 67 co-acts with the roller on the lever 66 for moving the rear feeder 42 up and down. These cams 59 and 67 overlap, so that the feeder 42 will be fed forward while it is down in co-action with the mesh and will be returned while it is up out of contact with the mesh. Similarly, the cam 62 co-acts with the roller on the lever 69 for moving the forward feeder 43 up and down; and the cam 70 co-acts with the roller on the lever 61 for moving the forward feeder 43 forward and back. These cams 62 and 70 also overlap. The position which the rear feeder 42 occupies during the major portion of the time is the raised and rearward position. The position which the forward feeder 43 occupies during the major portion of the time is the rearward downward position. When the feeders are in these positions, the rollers of the levers 58, 61, 66 and 69 are traveling on the unbroken, circular portions of their respective cams. With the shaft 19 rotating in the direction of the arrow on Fig. 4, and just prior to the time when the shaft reaches the position in which it is illustrated, the depression in cam 67 comes under the roller on lever 66, rocking the lever and causing corresponding rocking movement of the lever 65, so as to allow the rear feeder 42 to move downward from its normal position into contact with the mesh. Shortly thereafter, and just beyond the position illustrated in Fig. 4, the cam 59 engages the roller on lever 58, rocking that lever and its co-acting lever 56, to move the slide 46 and the feeder 42 carried thereby forward. Immediately after the slide and feeder have finished this forward movement, the rise in cam 67 engages the roller of lever 66, thereby rocking that lever and the lever 65, to raise the rear feeder 42. Shortly thereafter, the end of the cam 59 comes under the roller of lever 58, thereby rocking levers 58 and 56, to permit the slide 46, and the feeder 42 carried thereby, to be returned to their normal position, that is, the raised and rearward position. During all this period, the forward feeder 43 is in its normal position, that is, the rearward and downward position in contact with the mesh; and it is during this time, while the forward feeder 43 is in its normal position holding the mesh, and after the rear feeder has been moved forward in contact with the mesh, that the link-forming tools are operated. After they have completed their operation, cams 62 and 70 come into operation. First, the cam 62 comes under the roller of lever 61, thereby rocking levers 61 and 60 to permit the slide 47 and the forward feeder 43 carried thereby, to be moved forward by spring 54, carrying the mesh along with them. Next, cam 70 comes under the roller of lever 69, rocking that lever and lever 68, to raise the feeder 43. Then the end of cam 62 reaches the roller of lever 61, resulting in moving the feeder 43 back to its rearward position, and then the end of cam 70 reaches the roller of lever 69, thereby permitting the forward feeder 43 to be lowered into contact with the mesh.

The cycle of operations is therefore as follows:

Rear feeder 42 moves down into contact with the mesh; then forward, feeding the portion of the mesh with which it contacts; then upward out of contact with the mesh; and then rearward to its initial position; the link-forming tools are then operated; the forward feeder 43, which, during this time has been in contact with the mesh, is then moved forward to feed the mesh with which it is in contact; it is then raised out of contact with the mesh; it is then moved back, and it is then lowered into contact with the mesh. This cycle of operations may be varied somewhat, the primary essentials of the cycle when used in a machine for joining two strips of mesh being that the forward feeder shall be down in contact with the mesh and in its rearward position at the time when the rear feeder 42 is fed forward in contact with the mesh, so that the mesh between the two feeders will be closed up properly; that the link-forming tools be then operated, and that the forward feeder 43 be moved forward in contact with the mesh after the link-forming tools have been operated.

The more general features of the operation of the machine will now be described:

The two strips of mesh to be united on the machine are wound on the supply roller 10 on opposite sides of the intermediate flange 71. The ends of these two strips are carried across the supporting plate 9 and are secured to the take-up roll 11 or wound on that roll or laid over the roll. Preferably, loops are provided adjacent to the two rolls as indicated in Fig. 1. The two strips of mesh are smoothed out upon the feeding surface 9 and their adjacent edges are brought into parallel relation, spaced apart by the width of the projection 72. The side-guides 73 are then adjusted and secured in position so that as the two strips move along together their parallel relation and proper spacing will be maintained. The weighted plate 76 is then laid upon the mesh to assist in holding it flat upon the supporting surface with the links properly extended. The machine is then started in operation and the operation proceeds automatically, one line of rings being added to the mesh, each ring meshing with the rings of the two strips in the proper relation to complete a wide strip of mesh, consisting of the two narrow strips plus one row of links.

Referring to Fig. 6, the two strips to be united are indicated at 79 and 80. The rings which have been added to unite these two strips are the three rings of the row indicated at 81. It will be noted that each of the rings in this row 81, except, of course, the ring at the end of the row, must be linked with four rings of the mesh, that is, two rings of each of the strips 79 and 80. In the extended strip, these two rings of a strip with which the new ring must be linked do not overlap, so that preparatory to forming the new ring, the mesh is closed up an amount sufficient to cause the two rings of each strip with which the new rings must be meshed to overlap an amount sufficient to permit the legs of the staple for the new ring to be projected each through two rings of a strip. This is accomplished by moving the portions of the two strips in rear of the link-forming point forward by means of the rear feeder 42, while the portions of the two strips forward of that point are held stationary by the forward feeder 43. The forward feeder is moved down into contact with the mesh and becomes interlocked with it in the manner indicated in Fig. 5. When this is done, the rear feeder 42 is in the raised and rearward position indicated by the dotted lines in Fig. 5. From this position, it is moved downward and becomes interlocked with the mesh and is then moved forward, carrying the mesh with which it is in contact forward with it. This closes up the mesh between the two feeders, so that the two rings 82 and 83 at the edge of each of the two strips 79 and 80 overlap. The rear feeder 42 may then be raised and retracted and the link-forming tools are operated. The lower die 27 and the prongs 28 are moved forward, forming a staple from the piece of wire which has been cut off, and moving that staple upward along the path indicated by the arrow on Fig. 5, so that each leg of the staple is projected through the rings 82 and 83 of one of the strips of mesh. As this movement is completed, the upper die 41 is moved downward and the two dies co-act to form the staple into a ring. The link-forming tools are then retracted and thereafter the forward feeder 43 is moved forward carrying the mesh with it, so as to extend the portion of the mesh lying between the two feeders; this forward feeder is then raised, retracted and again moved downward into contact with the mesh and the operation proceeds as before.

The construction herein illustrated and described may be modified in numerous respects, while still utilizing the principles involved in this invention, and I wish it understood, therefore, that the invention is not limited with respect to the features of construction; but, on the contrary, may be utilized in machines which differ widely as to their structural characteristics. Also, the sequence of the several steps performed by the elements of the machine may be altered in several respects. All such departures from the construction and operation herein described I consider within the scope of the invention, and I aim to cover them by the terms of the appended claims. I wish it understood also that while the invention is of special value in a machine for use in securing together two long strips of mesh so as to make a single strip of greater width, certain of the features of the invention may be employed in machines for other uses, such, for instance, as the manufacture of mesh by the addition of successive rows of rings at one edge of a strip of mesh.

I claim:

1. In a machine for making ring mesh, the combination of a support, means for moving two strips of ring mesh step-by-step over the surface of the support with the adjacent edges of the two strips parallel and close together but spaced apart a predetermined amount, tools for forming rings, and means for operating the tools during the periods of rest of the step-by-step movement of the strips of mesh to form rings and mesh each of the rings so formed with two rings of each of the two strips of mesh on the support at the adjacent edges of the two strips to unite the strips; substantially as described.

2. In a machine for making ring mesh, the combination of link-forming tools, a support for two strips of ring mesh, means for moving the two strips and the tools relatively step by step, and means for operating the tools during each of the periods of rest of the step by step movement to form a staple, project each of the legs of the staple through two rings at the edge of one of the two strips of mesh, and then form the staple into a ring uniting the two strips; substantially as described.

3. In a machine for making link mesh, the combination of link-forming tools, a support for a piece of link mesh, means for closing up a portion of the mesh to cause adjacent links of the mesh to overlap, and means for operating the tools to form links and mesh them with overlapping links of the mesh; substantially as described.

4. In a machine for making link mesh, the combination of link-forming tools, means for supporting two strips of link mesh, means for closing up the mesh of the two strips to cause adjacent links of each of the strips to overlap, and means for operating the tools to form links and mesh them with overlapping links of each of the two strips; substantially as described.

5. In a machine for making link mesh, the combination of link-forming tools, means for supporting two strips of link mesh, means for feeding portions of the two strips on one side of the point of coaction of the link-forming tools while holding portions of the strips on opposite sides of that point to cause links of the strips to overlap, and means for operating the tools to form links and mesh them with overlapping links of the two strips to unite the two strips; substantially as described.

6. In a machine for making link mesh, the combination of link-forming tools, means for supporting two strips of link mesh, two feeders having grooved surfaces to coact with the mesh located on opposite sides of the point of coaction of the tools with the mesh, means for operating one of the feeders in contact with the mesh while holding the other feeder stationary to cause links of the two strips to overlap, and means for operating the tools to form links and mesh them with overlapping links of the two strips; substantially as described.

7. In a machine for making link mesh, the combination of link-forming tools, a support for two strips of mesh, a pair of feeders having grooved surfaces to coact with the mesh, means for moving the two feeders while in contact with the mesh, one after the other, whereby after movement of the rear feeder while the forward feeder remains stationary, links of the mesh are overlapped, and means for operating the forming tools to form links and mesh them with overlapping links of the mesh; substantially as described.

8. In a machine for making link mesh, the combination of link-forming tools, a support for two strips of link mesh, two feeders having grooved surfaces for coaction with the mesh, automatic mechanism for moving the two feeders while in contact with the mesh to feed the mesh and returning the feeders out of contact with the mesh, and means for operating the tools to form links and mesh them with links of the two strips of mesh at points on the strips lying between the two feeders; substantially as described.

9. In a machine for making link mesh, the combination of link-forming tools, a support for a piece of link mesh, two feeders having grooved surfaces to coact with the mesh, automatic mechanism for moving the two feeders in the direction of the length of the mesh while in contact with the mesh and returning them out of contact with the mesh, the rear feeder being moved in the feeding direction while the forward feeder is stationary, and means for operating the tools automatically during the periods of rest of the step by step movement of the mesh to form links and mesh them with links of the two strips of mesh at a point lying between the two feeders; substantially as described.

10. In a machine for making link mesh, link-forming tools and a feeding mechanism for feeding the mesh step by step relatively to the link-forming tools, comprising a support, a pair of slides mounted thereon for movement in a direction substantially parallel to the mesh, a feeder mounted upon each of the slides and movable thereon in a direction substantially transverse to the direction of movement of the slide, the feeders having grooved surfaces for coaction with the mesh, and being located on opposite sides of the point of co-action of the link-forming tools with the mesh, and automatic mechanism for moving the feeders relatively to the slides and for moving the slides and the feeders carried thereby upon the support; substantially as described.

11. In a machine for making link mesh, a feeding mechanism for feeding the mesh step by step relatively to the link-forming tools comprising a support, a pair of slides mounted thereon for movement in a direction substantially parallel to the mesh, a feeder mounted upon each of the slides and movable thereon in a direction substantially transverse to the direction of movement of the slide, the feeders having grooved surfaces for coaction with the mesh, and automatic mechanism for moving the feeders relatively to the slides and for moving the slides and the feeders carried thereby upon the support, the said automatic mechanism being timed so as to move the rear feeder and its slide in the feeding direction while the feeder is in contact with the mesh at a time when the forward feeder is stationary and in contact with the mesh; substantially as described.

12. In a machine for making link mesh, the combination of link-forming tools, a support for two strips of link mesh, a pair of feeders having surfaces grooved for co-action with the mesh located on opposite sides of the point of coaction of the tools with the strips, an operating shaft from which the forming tools are actuated, and mechanism connected to and operated from said shaft for moving each of the feeders into and out of contact with the mesh and for moving each of the feeders in the direction of the length of the mesh while in contact and while out of contact with the mesh; substantially as described.

13. In a machine for making link mesh, the combination of forming tools, a support for two strips of mesh, means for feeding the two strips step by step over the surface of the support, a projection rising from the surface of the support for spacing the strips apart a prescribed distance, side guides for coaction with the non-adjacent edges of the strips, and means for operating the forming tools to form links and mesh them with links of the two strips at the adjacent edges of the strips; substantially as described.

In testimony whereof I affix my signature.

RICHARD HATLEY BERKLEY.

Copies of this patent may be obtained for five cents each, by addressing the "Commissioner of Patents. Washington, D. C."